United States Patent [19]
Huppert

[11] Patent Number: 5,203,106
[45] Date of Patent: Apr. 20, 1993

[54] FISHING LURE

[76] Inventor: Mikel R. Huppert, Route 1, Box 72A, Ellsworth, Wis. 54011

[21] Appl. No.: 701,227

[22] Filed: May 16, 1991

[51] Int. Cl.$^5$ .............................................. A01K 85/00
[52] U.S. Cl. .................................. 43/42.39; 43/42.37; 43/42.38; 43/44.83
[58] Field of Search ................. 43/44.83, 43.16, 42.37, 43/42.39, 42.38, 42.23

[56] References Cited

U.S. PATENT DOCUMENTS

| | | | |
|---|---|---|---|
| 2,782,548 | 2/1957 | Linton | 43/44.83 |
| 2,854,781 | 10/1958 | Scozzari | 43/44.83 |
| 3,060,619 | 10/1962 | Cornick | 43/42.38 |
| 3,868,784 | 3/1975 | Sabol | 43/42.37 |
| 4,535,562 | 8/1985 | Fry | 43/44.83 |
| 4,742,639 | 5/1988 | Gunn | 43/42.39 |
| 4,819,366 | 4/1989 | Manno | 43/44.83 |
| 4,879,835 | 11/1989 | Sprayberry | 43/44.83 |
| 4,887,378 | 12/1989 | Sheehan | 43/42.25 |
| 4,926,579 | 5/1990 | Junenez | 43/43.2 |

OTHER PUBLICATIONS

"Jigs, Jigs, Jigs . . . ", Jeff Murray, North American Fisherman, pp. 49-52 (Exhibit A).
"The Age of Refined Jigs", Dave Mull, In-Fisherman, pp. 103-110 (Exhibit B).

*Primary Examiner*—Kurt C. Rowan
*Attorney, Agent, or Firm*—Merchant, Gould, Smith, Edell, Welter & Schmidt

[57] ABSTRACT

The present invention provides for a balanced lure 10 which remains upright and which provides a large hook gap. The hook 40 is shaped in an approximate "2" manner, the lead head 18 cooperatively connected to the base, thereby residing on opposite side of the shank from the barbed point. The intersection of the base of the two and the arcuate section provides an area to secure the fish line. Lure 10 may be used with either a plastic worm 22 or live bait and may be fished in either a vertical or horizontal manner.

12 Claims, 2 Drawing Sheets

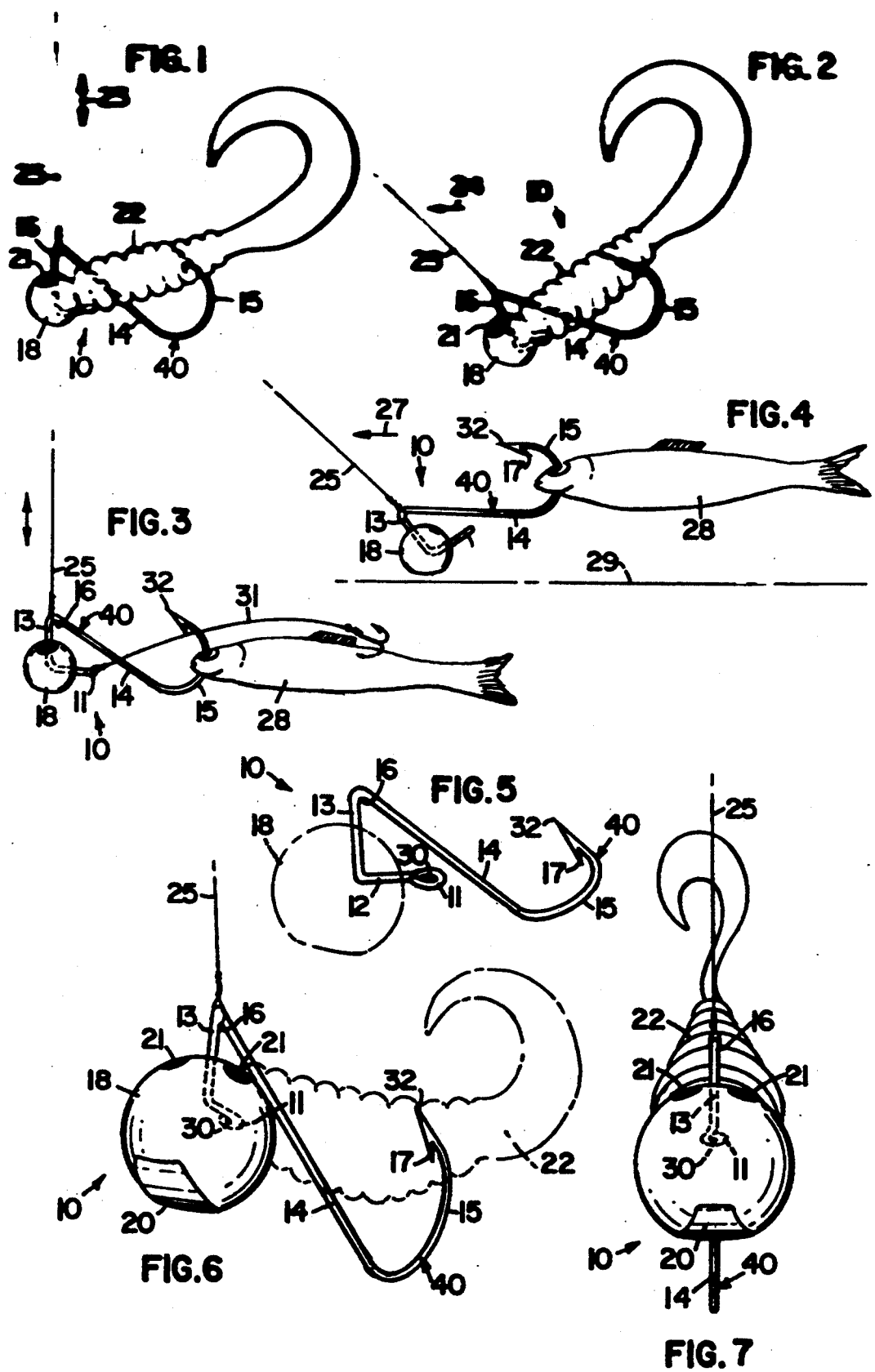

FISHING LURE

FIELD OF THE INVENTION

The present invention relates generally to equipment utilized in connection with catching fish, and more specifically to a balanced jig-type lure arranged and configured to present an open hook.

BACKGROUND ART

The bait and tackle industry is constantly changing and refining its equipment, although the ultimate objective to catch fish remains the same. This constant refinement has brought about numerous versions of the lure commonly referred to in the fishing industry as the "jig." A jig-type lure, as used herein, may be defined to include fishing tackle lures which sport a body, an eyelet for tying the line to the lure, and a hook used in simulating a "jigging" type action to attract fish.

The jig-type lure over time has been refined to include designs which are intended to make fishing more efficient. For example, several designs such as the Jig-A-Whopper Competition Head (trademark) (manufactured by UMM Holdings, Inc. of Dodge Center, Minn.) attempts to provide a wider hook gap (i.e., the gap between the body and the point of the hook) without utilizing a hook which is too large. A wider hook gap provides for more fish "hook-ups" by allowing the hook to be taken deeper into the fish's mouth, where the hook tends to enter into softer flesh and penetrate. Merely by using a larger hook to increase hook gap, however, tends to frustrate the fish from taking the hook. Additionally, many jigs' design caused the eyelet or lead head to close the hook gap. Therefore, a need arises to design a jig-type lure with a balance between the size of the hook while maximizing the hook gap.

Other refinements such as Northland Tackle's Fire-Ball jig (trademark) manufactured by Northland Fishing Tackle of Bemidji, Minn., are designed to operate in the water in a certain manner. The "Fire-Ball," for example, is designed for the hook to point up into the upper jaw of the fish when the lure is hanging down. Still other jigs rely on color or the provision for a "stinger" (i.e., a treble hook which is typically secured to a second eyelet on the jig). However, each of the foregoing jigs tend to have drawbacks associated due to concentration on individual aspects of the lure and not solving the overall problems of balance and hook gap, among others.

Therefore, although jig designs have concentrated on making refinements such as those discussed above, such designs have heretofore not been addressed on an overall basis. Therefore, there arises a need for a new and improved jig having a balanced and upright fishing position when being fished in both a vertical and horizontal position, and having a large hook gap.

SUMMARY OF THE INVENTION

The present invention provides an improved fishing lure that overcomes the foregoing and other difficulties associated with the prior art. In accordance with the principles of the present invention, there is provided a fishing lure, of the jig type, wherein the hook is formed in an approximate "2" shape. Continuing with the "2" analogy, the lead head (i.e., the body) of the jig is cooperatively connected on the base of the "2" proximate the intersection of the arcuate section and the base section. The location of the lead head provides a balanced hook. At the intersection, there is provided an area in which to tie the line to the jig. Since this area is open, tying the line to the jig is easier. The eyelet of the hook is bent at ninety degrees with respect to the base of the "2." The eyelet, due to its extension beyond the head and its location on the opposite side of the shank from the point of the hook, provides an excellent location for tying a stinger.

One feature of the present invention is the balance of the lure which provides for the jig remaining in a horizontal position whether the lure is being fished in a vertical (i.e., fished in a traditional jig manner, wherein vertical refers to the general axis of the fishing line with respect to the Earth's surface) or a horizontal (i.e., fished by casting, trolling or current drifting, wherein horizontal refers to the general axis of the fishing line with respect to the Earth's surface) manner. The term "horizontal position of the lure" refers to the general axis of the shank of the hook residing generally parallel to the Earth's surface, thereby providing an "open" hook position. Additionally, due to the jig's balance, the jig exhibits a "teeter-totter" action, when the lure is being jigged due to the placement of the connection point for the fishing line and the location of the lead head.

Another feature of the present lure is that the lure acts as a weedless jig when fished with a plastic grub/worm. The grub may be inserted through the arcuate portion of the hook with the hook set into the plastic body of the grub.

Yet another feature of the present invention is the flat rounded surface of the lead head, which provides for promotion of the lure remaining upright when being jigged across the bottom of a hard, sandy or rocky lake/river bottom.

Therefore, according to one aspect of the present invention, there is provided a fish lure of the type that is secured to a fish line, comprising: (a) a head member; (b) a hook member, said hook member including a shank; (c) receiving means, disposed between and integrally joining said head member and said hook member for securing the fish line.

According to another aspect of the present invention, there is provided a fish lure, comprising: (a) a first end, having an integrally formed eyelet; (b) a second end, having a barb integrally formed proximate said second end; (c) a generally straight first segment cooperatively connected to said first end; (d) a generally straight second segment cooperatively connected to said first segment; (e) a generally straight third segment cooperatively connected to said second segment; (f) an arcuate fourth segment cooperatively connected to said second end and said third segment, wherein the arcuate path is greatest between said second end and said third segment, said arcuate path gradually decreasing in radius as it approaches said second end and said third segment; and (f) a lead head cooperatively connected to said first and second segment, wherein when the lure is balanced at the intersection between said second and third segments and said third segment is oriented generally horizontal.

These and other advantages and features which characterize the present invention are pointed out with particularity in the claims annexed hereto and forming a further part hereof. However, for a better understanding of the invention, its advantages and objects attained by its use, reference should be made to the Drawing which forms a further part hereof and to the accompanying descriptive matter, in which there is illustrated and described a preferred embodiment of the present invention.

BRIEF DESCRIPTION OF THE DRAWING

In the Drawing wherein like parts are referenced by like numerals throughout the several views.

FIG. 1 is a side elevational view of a preferred embodiment jig-type lure constructed according to the principles of the present invention, wherein the jig is being fished in a vertical manner;

FIG. 2 is a side elevational view of the jig of FIG. 1, wherein the jig is being fished in a horizontal manner;

FIG. 3 is a side elevational view of the jig of FIG. 1, wherein the jig is illustrated as utilizing live bait and is being fished in a vertical manner;

FIG. 4 is a side elevational view of the jig of FIG. 3, wherein the jig is illustrated as utilizing live bait and is being fished in a horizontal manner;

FIG. 5 is a side elevational view of the hook of the jig of FIG. 1 with the lead head location shown in phantom line;

FIG. 6 is a perspective view of the jig of FIG. 1;

FIG. 7 is a front elevational view of the jig of FIG. 1;

DETAILED DESCRIPTION

Figure 8:
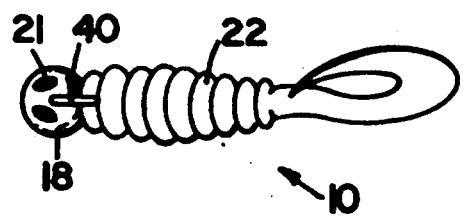
FIG. 8 is a top view of the jig of FIG. 1.

The principles of the present invention apply particularly well to fishing lures. A preferred application for this invention is for a jig-type fishing lure for catching Walleye fish. Such preferred application, however, is typical of only one of the innumerable types of fishing applications in which the principles of the present invention might be employed.

As noted above, the preferred embodiment, constructed according to the principles of the present invention, provides for a jig which is designed to add to, improve upon, and to combine what many previous jigs have been designed for. In particular, the present jig is designed for good hook penetration of a fish by presenting a large hook gap without utilizing too large of a hook, and for providing a balance point which tends to keep the hook oriented in a horizontal position, while still offering a wobble action when being fished.

Referring next to the Figs., there is illustrated a preferred embodiment lure and hook. As used herein, "hook" will refer to the preferred integral device 40, while "lure" will collectively refer to the hook 40 and the head 18. Referring first to FIG. 5, the hook 40 is illustrated with head 18 in phantom. The hook 40 is comprised of several segments which will be next described. First end 11 includes an eyelet 18. First generally straight segment 12 is preferable integrally connected to first end 11. Second segment 13 is also preferably straight and integrally connected to first segment 12. Second segment 13 forms the base of the "2" shape generally formed by the hook 40. In the preferred embodiment, first segment 12 and second segment 13 form a 90 degree angle, although other angles might be used. Third segment 14 is preferably generally straight and integrally connected to second segment 13, while forming the shank of the hook 40. Located between second segment 13 and third segment 14 is an intersection 16 of the two segments which forms an acute angle. The intersection 16 forms a line receiving area (i.e., that area where the fishing line 25 is attached to the lure 10). The angle formed is of some importance since the lead head 18 (described further below) will tend to pivot the lure about the intersection 16. Therefore, in order to keep the line approximately at the intersection 16 during fishing, the angle must be maintained at an angle less than 90 degrees, and is preferably approximately 35 degrees, however this angle will vary with the size of the hook 40 and the length of the hook shank. Fourth segment 15 is preferably integrally connected to third segment 14 and includes an arcuate portion which tends to a progressively sharper radius in the middle of fourth segment 15. Finally, second end 32 includes the hook point and located proximate said second end is barb 17.

As previously noted, the segments 12, 13, 14, and 15, and first and second ends 11, 32, together approximate the shape of the number "2". It will be appreciated, by those skilled in the art, however, that preferably the second end 32 is bent so as to point slightly away from the third segment 14 (i.e., the hook's shank). This allows for the use of a thin wire hook for easy hook penetration. This hook type is commonly referred to as "aberdeen-style". The second end 32 should not be pointed too far away from third segment 14 since this tends to increase the fish's leverage on the hook and may tend to increase breakage of hook 40. Also, it will be appreciated the while preferably the hook 40 is integrally formed, the hook segments 12, 13, 14 and 15 may be cooperatively connected by solder, welding and other well known means. Further, preferably the hook segments 12, 13, 14, and 15 lie within the same general plane. Additionally, it will be immediately appreciated by those skilled in the art that the orientation and location of the lead head 18 allows for a completely free hook area providing for a large hook gap. This arrangement provides for no lead heads or eyelets which narrow the hook gap.

The location of the head 18 and the intersection area 16 where the line 25 is tied (best seen in FIGS. 1-4), provides for the lure 10 to tend to hang with the head 18 "down" and the second end 32 generally upright. Those skilled in the art will immediately appreciate that the head 18 will tend to hang directly below the intersection 16 due to gravity. However, when jigged or pulled through the water when trolling, the action of the water past the head 18 will tend to rock the hook 10 back and forth about the intersection 16, thereby creating a waddling or "teeter-totter" effect. Such effect is magnified by a grub 22 or other live bait 28.

Referring now to FIGS. 6 and 7, the flat portion 20 of the head 18 is illustrated. The flat rounded portion 20 provides for balance when the lure 10 is resting generally upon a rocky, or packed sand surface so as to maintain the hook in a generally upright position. This flat rounded portion 20 is a cylinder shaped portion of the otherwise round lead head 18. This is best seen in FIGS. 4 and 6. Such shape also promotes the lure 10 to rock back into a proper bait presentation position as illustrated in FIGS. 1-4. Also illustrated in FIG. 5, the eyelet 30 extends from the head 15 and provides an area in which to fasten a stinger 31 (best seen in FIG. 3).

Next referring to FIGS. 1 and 2, the lure 10 is illustrated being fished in a vertical manner. In FIG. 1 the double-headed arrow 23 illustrates the jigging motion commonly used when fishing in this manner. Also attached to the lure 10 is a plastic body (such as grub 22 illustrated which may be many different colors and styles, as is well known in the art. Those skilled in the art will also recognize that in FIG. 1 the sharp second end 32 is embedded in the grub 22 so as to be operative in a weedless manner. When fished in this vertical manner, the lure 10 stays in the horizontal position (i.e., the mean plane formed by the hook segments 12, 13, 14, and 15 is generally vertical) due to the head 18 tending to hang directly beneath intersection 16. Therefore, the lure 10 tends to remain in a proper hook set position, while exhibiting a jigging motion due to the resistance of the grub 22 through the water when settling and the weight of the head 18. The grub 22 tends to maintain its position on third segment 14 due to the location of first end's 11 proximity. When placing grub 22 onto third segment 14 it may be necessary to pull the third segment 14 away from the first end 11. The resiliency of the hook 40 returns the hook to its original position thereby tending to keep grub 22 in position.

When trolled or fished in a current, such as in a river, the jig has a swimming/teeter-totter action as described above when used with live bait or plastic grubs. Arrow 24 in FIG. 2 represents the direction of travel (or direction of an opposite current) of the lure 10. Similarly, the lure 10 remains in an upright proper hook set position.

FIGS. 3 and 4 illustrate use of the lure 10 with live bait 28. Although a minnow is illustrated, any other type of bait might be used. FIG. 3 illustrates the lure 10, being fished in a vertical manner with a jigging action as indicated by arrow 26 and with a stinger 31.

Referring to FIG. 4, the interaction of the flat cylinder surface 20 with the bottom 29 is illustrated. As noted above, lure 10 tends to stay in an upright position when resting on the bottom 29. This is due to the flat cylinder bottom 20 and the manner in which the weight of the head 18 and hook 32 are balanced. Therefore, when fishing the lure 10 in a horizontal position, whether casting or trolling, the lure 10 stays in the upright position whether swimming, dragging or hopping it across the bottom 29. Arrow 27 indicates the line of direction of the lure's 10 movement.

Still referring to FIG. 4, it will be noted that on a tight line 25, lure 10 pivots forward elevating the second end 16 off the bottom 29, thereby putting the shank generally parallel to the bottom 29. This allows the lure 10 to be more easily consumed by a fish.

As noted above, lure 10 is a weedless jig when fished with plastic grub 22 (not only weedless, but also able to avoid other underwater obstacles). The design also allows for improved hook 40 penetration due to the hook point 32 being almost perpendicular to the grub 22. The front tip of the grub 22 is held in place by the stinger eyelet 30. This prevents it from sliding on the third segment 14 (i.e., the hook shank). The rear midsection of the grub 22 is secured by the barb 17.

With the preferred embodiment lure 10, the user has an option of utilizing a stinger hook 31 for short takers. The stinger 31 is attached to an eyelet 30 located behind the head 20. The eyelet 30 is in a unique location which is less noticeable to a fish and to protect it to minimize hang-ups.

Figure 9:
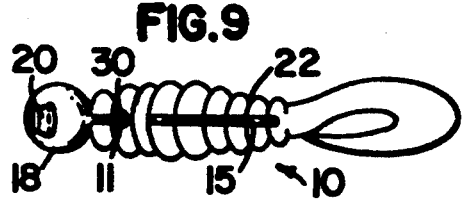
FIG. 9 is a bottom view of the jig of FIG. 1.
Figure 10:
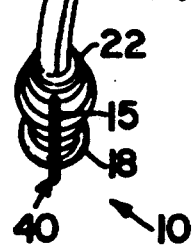
FIG. 10 is a back view of the jig of FIG. 1.

Lure 10 is designed for quick tie-ons as there is no small paint-clogged eyes to deal with since fishing line 25 is connected at intersection 16. The lure may come in an array of colors and combinations and can be used with the user's choice of dressings. The eyes 21 on the head 18 are positioned so fish can always focus on them. The hook 40 finish may be either bronze or gold and when the lure 10 is rigged in a weedless fashion, the exposed hook 40 areas appear to be fins to give the lure 10 a complete bait fish appeal. FIGS. 8, 9 and 10 show additional views of the lure 10.

Preferably the head 18 is constructed of a painted lead and for a size 2/0 hook, a ¼ ounce head is used. As those skilled in the art will recognize, the hook sizes and weight of the head may be changed from lure 10 to lure 10 according to sizes and types of fish, fishing conditions and type of bait being utilized, among other factors.

Figure 11:
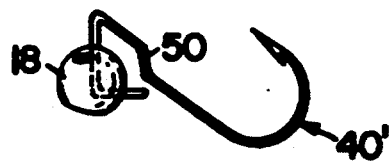
FIG. 11 is an alternative embodiment of the jig of FIG. 1.

Referring to FIG. 11, an alternative embodiment hook 40a is illustrated. Those skilled in the art will appreciate that although the hook gap of hook 40a is slightly reduced, various angles and other hooks may be accommodated by the offsetting of hook 40a. Additionally, the offset portion 50 of the hook 40a helps keep a plastic grub/worm 22 in place on the hook shank.

It is to be understood that even though numerous characteristics and advantages of the present invention have been set forth in the foregoing description, together with details of the structure and function of the invention, the disclosure is illustrative only and changes may be made in detail. The invention should be viewed to its fullest extent indicated by the broad general meaning of the terms in which the appended claims are expressed.

I claim:

1. A fish lure, comprising:
   (a) a first end;
   (b) a second end;
   (c) a generally straight first segment cooperatively connected to said first end;
   (d) a generally straight second segment cooperatively connected to said first segment;
   (e) a generally straight third segment cooperatively connected to said second segment;
   (f) an arcuate fourth segment having an arcuate path cooperatively connected to said second end and said third segment, wherein the arcuate path is greatest between said second end and said third segment, said arcuate path gradually decreasing in radius as it approaches said second end and said third segment and wherein said arcuate fourth segment defines a projected area bounded on one side by said third segment; and
   (g) a head member cooperatively connected to said first and second segment, wherein when the lure is balanced at the intersection between said second and third segments, then said head member tends to hang directly below said intersection thereby orienting said third segment generally horizontal and wherein said head member is arranged and configured to lie entirely outside of said projected area, whereby the fish lure has an optimized hook gap, wherein hook gap is defined as the gap between said head member and said second end.

2. A lure according to claim 1, wherein said second end includes an integrally formed barb.

3. A lure according to claim 1, wherein said first and second ends and said first, second, third, and fourth segments comprise a single individual member and said first and third segments do not touch one another.

4. A lure according to claim 1, wherein said first ane includes an integrally formed eyelet.

5. A lure according to claim 4, further comprising a plastic member having a first tip and a midsection, said first tip cooperatively connected to said eyelet and said midsection cooperatively connected to said second end, whereby the lure tends to avoid entanglement with underwater obstacles.

6. A lure according to claim 4, further comprising a stinger hook cooperatively attached to said eyelet.

7. A lure according to claim 5, further comprising a stinger hook cooperatively attached to said eyelet and said plastic member.

8. A lure according to claim 5, wherein said plastic member is arranged and configured to resemble an insect.

9. A lure according to claim 1, wherein said head member includes a flat surface, said flat surface being arranged and configured generally on the portion of said head member which is lowest when the lure is operative in the water, wherein the general plane formed by said segments tends to remain generally vertical with respect to the surface of the Earth.

10. A lure according to claim 1, wherein said head is constructed of lead.

11. A lure according to claim 3, wherein said single integral member is constructed of wire.

12. A lure according to claim 1, wherein said intersection forms an acute angle thereby forming an open loop for easily securing the lure to a fishing line.

* * * * *